United States Patent
Sahu (10) Patent No.: US 12,085,903 B2
(45) Date of Patent: Sep. 10, 2024

(54) METHOD, DEVICE, AND SYSTEM FOR CONFIGURING A COATING MACHINE

(71) Applicant: Subrat Sahu, Karnataka (IN)

(72) Inventor: Subrat Sahu, Karnataka (IN)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 17/703,950

(22) Filed: Mar. 24, 2022

(65) Prior Publication Data

US 2022/0308535 A1   Sep. 29, 2022

(30) Foreign Application Priority Data

Mar. 26, 2021   (EP) .................................... 21165098

(51) Int. Cl.
  *G05B 13/04*   (2006.01)
  *B05D 1/00*   (2006.01)
  *G05B 13/02*   (2006.01)

(52) U.S. Cl.
  CPC ............. *G05B 13/048* (2013.01); *B05D 1/00* (2013.01); *G05B 13/0265* (2013.01); *G05B 13/042* (2013.01)

(58) Field of Classification Search
  CPC . G05B 13/048; G05B 13/0265; G05B 13/042
  USPC ........................................................ 700/64
  See application file for complete search history.

(56) References Cited

U.S. PATENT DOCUMENTS

| | | | |
|---|---|---|---|
| 6,256,597 B1* | 7/2001 | Wang | B25J 9/1661 703/22 |
| 2003/0143318 A1* | 7/2003 | Schutte | C23C 4/12 427/446 |
| 2006/0177566 A1* | 8/2006 | Price | C25D 11/04 118/712 |
| 2011/0046765 A1* | 2/2011 | Yamagami | H01L 22/20 700/103 |
| 2014/0030825 A1* | 1/2014 | Park | H01L 31/206 118/621 |
| 2016/0362780 A1* | 12/2016 | Van De Putte | H01J 37/32972 |
| 2020/0306780 A1* | 10/2020 | Maas | B25J 19/02 |
| 2020/0391241 A1* | 12/2020 | Hazan | B25J 9/1664 |

* cited by examiner

*Primary Examiner* — Jigneshkumar C Patel
(74) *Attorney, Agent, or Firm* — Lempia Summerfield Katz LLC (57) ABSTRACT

A method, device, and system for configuring a coating machine for coating a surface of a product using a coating substance are provided. The method includes determining a value associated with one or more parameters from a plurality of parameters associated with the coating operation. The method also includes predicting a value associated with at least one attribute associable with the coating substance based on the determined value associated with the one or more parameters using a trained machine learning model. The method includes configuring the coating machine for coating the surface using the coating substance based on the predicted value associated with the at least one attribute associable with the coating substance. The method also includes initiating a coating operation at the configured coating machine for coating the surface of the product using the coating substance.

21 Claims, 6 Drawing Sheets

METHOD, DEVICE, AND SYSTEM FOR CONFIGURING A COATING MACHINE

This application claims priority to European Patent Application No. 21165098.1-1205, filed on Mar. 26, 2021, which is incorporated herein in its entirety.

BACKGROUND

The present embodiments relate to coating a surface using a coating substance and, more specifically, configuring a coating machine for coating a surface using a coating substance.

In a manufacturing facility, coating a manufactured product with a coating substance, such as paint, is a step to be performed. The coating substance may increase the shelf-life of the product and may also add to aesthetic appearance of the product. In automotive manufacturing facility, painting an automotive part or body is a step to be performed. Painting of the automotive part is a complex process and may sometimes be more expensive than the automotive part. Therefore, the process of coating the automotive part with the coating substance is to be performed accurately and without any error. The automotive parts undergo a quality check process, in which an attribute of the coating substance such as a dry film thickness of the coating substance coated on the automotive part is checked. The quality check, however, may be performed only for approximately one out of five hundred automobiles. Additionally, the time taken for the quality checks adds to a feedback response time in the manufacturing facility. Therefore, by the time corrective measures are implemented to improve the dry film thickness of the coating substance, a plurality of automotive parts may have already been coated with the coating substance using a faulty coating operation. The automotive parts may have to be repaired to remove the defective paint thickness or, in some cases, be discarded. This may add to a loss of resources such as time, raw material, electricity, coating substance, etc.

Currently, the thickness of the coating substance coated on to the manufactured product is performed manually using a coating thickness gauge. Therefore, currently, there is no way by which the thickness of the coating substance may be determined before the coating substance is coated onto the manufactured product.

SUMMARY AND DESCRIPTION

The scope of the present invention is defined solely by the appended claims and is not affected to any degree by the statements within this summary.

In light of the above, there is a need for a method, device, and system for configuring a coating machine for coating a surface using a coating substance. The present embodiments may obviate one or more of the drawbacks or limitations in the related art. For example, a method, a device, and a system for configuring a coating machine for coating a surface using a coating substance are provided.

In one embodiment, a method of configuring a coating machine for coating a surface using a coating substance is provided. The coating machine may be equipment in a manufacturing set-up that may perform a coating operation on the surface with the coating substance. For example, the coating machine may be a robotic arm configured to coat the surface with the coating substance. The coating substance may be any substance capable of being coated cohesively on to a given surface. The surface may be, for example, an automotive body part, a part of a machine, or any other part of a manufactured product. In an embodiment, the coating substance may include, for example, paint, primer, etc. The method includes determining a value associated with one or more parameters from a plurality of parameters associated with the coating operation. The plurality of parameters may be the parameters that affect the coating substance in one form or other. The plurality of parameters may define a quality attribute associated with the coating substance. Therefore, any change in the value associated with the parameters may affect the attribute associated with the coating substance. In an embodiment, the plurality of the parameters may include, but are not limited to, voltage associated with the coating machine, current passing through the coating machine, tank level of a pre-coating substance, pH of the coating substance, temperature of a baking oven configured to bake the manufactured product once coated with the coating substance, volume of the coating substance, and non-volatility of the coating substance.

The method further includes predicting a value associated with at least one attribute associable with the coating substance. The prediction may be performed using a trained machine learning model based on the determined value associated with the one or more parameters. The one or more parameters may contribute to the at least one attribute associable with the coating substance. Additionally, the method includes configuring the coating machine for coating the surface using the coating substance based on the predicted value associated with the at least one attribute associable with the coating substance. In an embodiment, the coating machine may be configured based on the value associated with the one or more parameters that contribute to the at least one attribute value. In one embodiment, the method enables effective management of the at least one attribute value associable with the coating substance. Therefore, any loss arising due to faulty coating operation is avoided.

According to a further embodiment, the method includes simulating a coating operation for coating the surface using the coating substance based on the predicted attribute value. Simulating the coating operation enables predicting the outcome of the coating operation based on the predicted attribute value. Simulation may be performed, for example, using a simulation model configured to replicate the behavior of a real-world system, virtually. In an embodiment, the predicted attribute value may contribute to the quality of the coating substance. Therefore, simulating the coating operation based on the predicted attribute value enables determining if the outcome of the coating operation would be successful. The method further includes analyzing the result of the simulation of the coating operation and determining whether the coating operation matches an expected standard based on the analysis of the result of simulation. The expected standard may be an optimum quality value associated with the manufactured product once the coating operation is completed. In an embodiment, the analysis of the result of the simulation may include comparing the simulation result with an expected standard associated with the coating operation. In one embodiment, the coating machine may be configured effectively to achieve an optimum quality of the manufactured product.

According to an embodiment, if the result of simulation of the coating operation matches the expected standard, the coating machine is configured for coating the surface using the coating substance. The configuration of the coating machine may be based on the value associated with the one or more parameters associated with the coating operation.

Therefore, if the result of the simulation of the coating operation matches the expected standard, the value of the one or more parameters associated with the coating operation may be deemed to be within a pre-defined range for optimum functioning of the coating machine. In one embodiment, configuration of the coating machine enables effective coating operation of the coating substance on to the manufactured product.

According to yet another embodiment, if the result of simulation of the coating operation does not match the expected standard, the value of the one or more parameters associated with the coating operation may be corrected. Correction of the value of the one or more parameters enables the outcome of the coating operation to match the expected standard. Therefore, any loss of resources due to faulty coating operation is prevented.

According to another embodiment, the method further includes predicting a modified attribute value associated with the at least one attribute associable with the coating substance, based on the corrected value of the one or more parameters. Once the value of the one or more parameters are corrected, the modified attribute value associated with the at least one attribute may be determined using the trained machine learning model. Determination of the modified attribute value enables determining if the coating operation matches the expected standard after the value of the one or more parameters are corrected.

According to yet another embodiment, the method of determining the value associated with the one or more parameters from the plurality of parameters associated with the coating operation includes determining a plurality of parameters associated with the coating operation. The plurality of parameters may be parameters contributing to the attribute associable with the coating substance. The method further includes identifying the one or more parameters from the plurality of parameters associated with the coating operation. The one or more parameters from the plurality of parameters may be chosen based on a quantifiable effect of the one or more parameters on the attribute associable with the coating substance. The quantifiable effect may be such that any deviation in the value associated with the one or more parameters may affect a quality associated with the attribute associable with the coating substance.

The method further includes determining the value associated with the one or more parameters associated with the coating operation. In an embodiment, the value associated with the one or more parameters may be obtained from one or more sensors associated with the coating machine and the manufacturing unit. In one embodiment, the one or more parameters affecting the quality associated with the attribute may be considered for predicting the attribute value associable with the coating substance. Therefore, any deviation in the coating operation may be determined effectively.

According to another embodiment, the method of identifying the one or more parameters from the plurality of parameters associated with the coating operation includes determining a relation between each parameter of the plurality of parameters and the coating substance. The relation between the parameters and the coating substance may be determined based on one or more reference values associated with the plurality of parameters. The reference values may be, for example, historical values associated with the plurality of parameters that may have been captured during previous instances of the coating operation. The relation between the plurality of the parameters and the coating substance may indicate which parameter(s) of the plurality of parameters affect the coating substance more. For example, the relation between the parameters and the coating substance may indicate which parameter(s) of the plurality of parameters may affect the attribute associable with the coating substance.

The method further includes calculating an effect of each parameter of the plurality of the parameters on the attribute associable with the coating substance. The effect on the coating substance may be, for example, a change in a film thickness value associated with the coating substance.

The method further includes determining the one or more parameters from the plurality of parameters associated with the coating operation. The determination may be based on the calculated effect of each parameter of the plurality of the parameters associated with the coating operation on the attribute. Therefore, the parameters that may not have a significant effect or may have a negligible effect on the attribute associated with the coating substance may not be included as the one or more parameters from the plurality of parameters associated with the coating operation. In one embodiment, accurate identification of the one or more parameters affecting the coating substance may be identified. Therefore, any error in the coating operation may be rectified effectively by correcting the identified one or more parameters associated with the coating operation.

According to yet another embodiment, the method of correcting the value of the one or more parameters includes identifying a real-time value associated with the one or more parameters. The one or more parameters may be obtained, for example, from the one or more sensors associated with the coating machine. Additionally, the one or more sensors may also be associated with one or more components involved in the coating operation of the coating substance.

The method further includes determining if the value of the one or more parameters associated with the coating operation is within a pre-defined range. The pre-defined range may be, for example, an optimum value range associable with the one or more parameters. In an embodiment, the optimum value range value may be the value range within which the value of the one or more parameters may be in order that the coating machine coats the surface with the coating substance effectively. If the value of the one or more parameters is outside the pre-defined range, the value of the one or more parameters is corrected such that the value of the one or more parameters is brought within the pre-defined range. In an embodiment, the value of the one or more parameters may be corrected by increasing or decreasing the value of the one or more parameters accordingly. In one embodiment, correction of the value of the one or more parameters enables maintenance of accuracy of the coating operation.

The method further includes providing one or more recommendations for optimizing the attribute associable with the coating substance. The recommendations may include one or more steps that may be performed by a user of the manufacturing unit to optimize the attribute value associable with the coating substance. In one embodiment, the recommendations may optimize the coating operation performed by the coating machine. In an embodiment, the recommendations may be provided to the user of the manufacturing unit on a graphical user interface of a display unit of a system associated with the manufacturing unit.

According to an embodiment, the machine learning model is a random forest regression model. Therefore, a combination of regression and classification of input data is performed to effectively configure the coating machine for coating the surface using the coating substance.

According to an embodiment, the attribute associated with the coating substance may be dry film thickness associated with the coating substance, wet film thickness associated with the coating substance, thickness of individual layers of the coating substance, etc.

The method further includes training at least one machine learning model to configure a coating machine for coating a surface using a coating substance. The method includes receiving one or more reference values associated with one or more parameters associated with the coating operation. The reference values may be, for example, values of the one or more parameters captured historically during past coating operations performed by the coating machine. The reference values may be an indication of a status of multiple components involved in the coating operation. The method further includes obtaining a real-time value associated with the one or more parameters from the one or more sensors associated with the coating machine.

The one or more sensors may be configured to capture values of the one or more parameters associated with the coating operation. The real-time value of the one or more parameters provides a real-time status of the multiple components involved in the coating operation. Further, the method includes determining a value associated with an attribute associable with the coating substance using the machine learning model. The value of the attribute may be determined based on the real-time value and the reference values associated with the one or more parameters.

The method further includes determining whether the value associated with the attribute is within a pre-defined range. The pre-defined range may be a range within which the value of the attribute must lie to maintain an accurate quality of the manufactured product. The method further includes correcting the real-time value of the one or more parameters associated with the coating operation if the value of the attribute is not within the pre-defined range. In an embodiment, the method of correcting the real-time value of the one or more parameters enables maintaining the value associated with the attribute within the pre-defined range. The method further includes adjusting the machine learning model based on the corrected value of the one or more parameters associated with the coating operation.

In another embodiment, a device for configuring a coating machine for coating a surface using a coating substance is provided. The device includes one or more processing units and a memory coupled to the one or more processing units. The memory includes a configuration module configured to perform the method acts as described above using at least one trained machine learning model.

In yet another embodiment, a system for configuring a coating machine for coating a surface using a coating substance is provided. The system includes processing units and one or more sensors communicatively coupled to the one or more servers. The one or more sensors are configured to capture a value associated with a plurality of parameters associated with the coating operation. The processing units includes computer-readable instructions that, when executed by the processing units, cause the processing units to perform the method as described above.

In another embodiment, a computer program product including a computer program is provided. The computer program is loadable into a storage unit of a computer system and includes program code sections to make the computer system execute the method described above when the computer program is executed in the computer system.

In yet another embodiment, a non-transitory computer-readable medium, on which program code sections of a computer program are saved is provided. The program code sections are loadable into and/or executable in a computer system to make the computer system execute the method as described above when the program code sections are executed in the computer system.

DETAILED DESCRIPTION

Hereinafter, embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1:
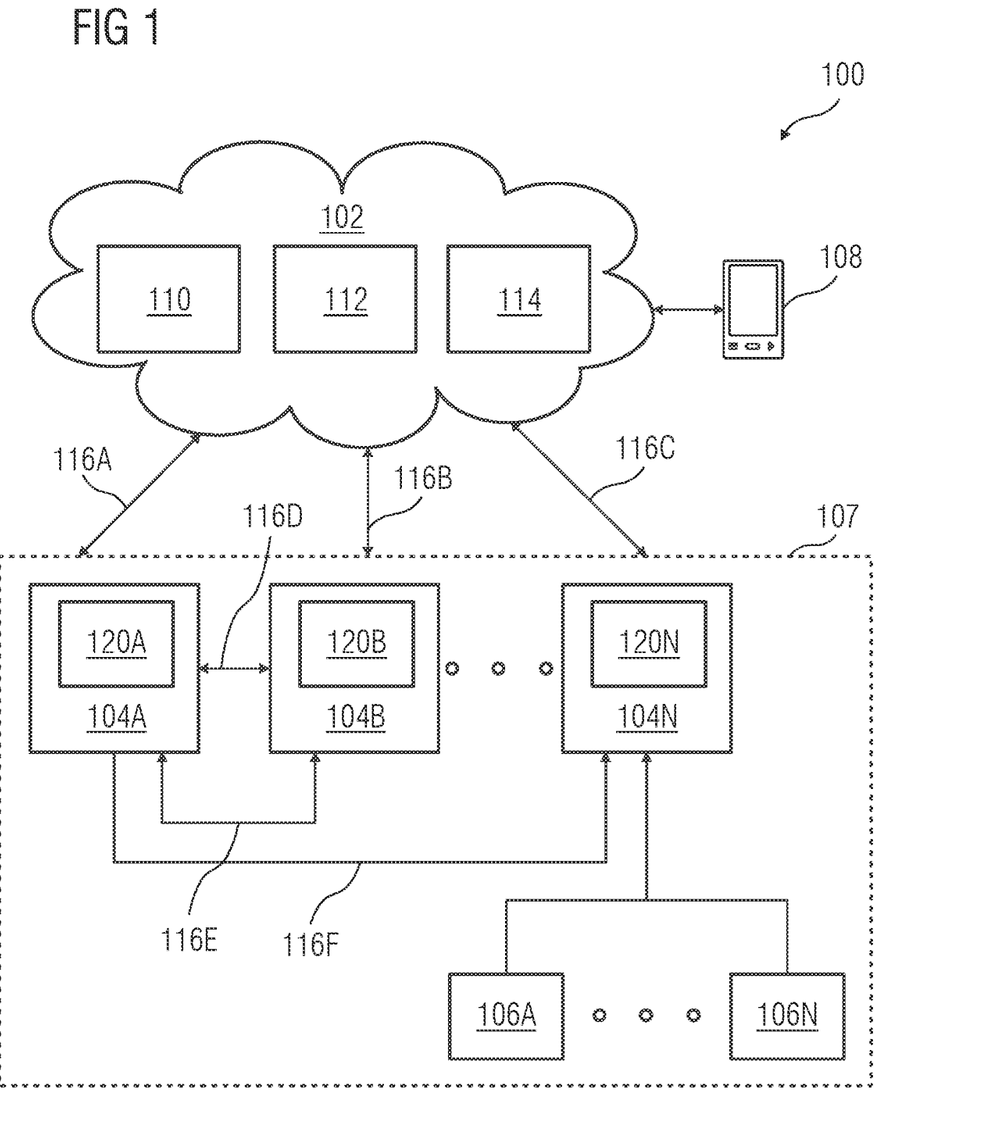
FIG. 1 is a schematic representation of a manufacturing unit, according to an embodiment.

FIG. 1 is a schematic representation of a manufacturing unit 100, according to an embodiment. The manufacturing unit 100 includes a cloud computing platform 102, one or more technical installations 107 connected to the cloud computing platform 102, and a user device 108 associated with a user of the technical installation 107. The technical installation 107 may be a manufacturing facility, etc. The technical installations 107 may be geographically distributed. Each of the technical installations 107 may include a number of devices or components 104A-N. The components 104A-N may include different types of assets (e.g., equipment, machines, sensors, actuators, etc.) located in the technical installation 107. Each of the components 104A-N is capable of communicating with the cloud computing platform 102 using respective communication interfaces 120A-N via communication links 116A-C via the Internet or a network. Also, the components 104A-N are capable of communicating with each other using respective communication interfaces 120A-N via communication links 116D to 116F. The communication links 116D to 116F may be wired or wireless links.

Also, in the technical installation 107, the one or more components 104N may be connected to assets 106A-N in the technical installation 107. Such assets 106A-N are not capable of directly communicating with the cloud platform 102. As shown in FIG. 1, the component 104N is connected to the assets 106A-N via wired or wireless network. For example, the component 104N is an IoT gateway, and the assets 106A-N may be robots, sensors, actuators, machines, or other field devices that communicate with the cloud computing platform 102 via the IoT gateway 104N.

Each of the components 104A-N is configured for communicating with the cloud computing platform 102 via the communication interfaces 120A-N. The components 104A-N may have an operating system and at least one software program for performing desired operations in the technical installation 107. Also, the components 104A-N may run software applications for collecting, pre-processing plant data (e.g., process data) and transmitting the pre-processed data to the cloud computing platform 102.

The cloud computing platform 102 may be a cloud infrastructure capable of providing cloud-based services such as data storage services, data analytics services, data visualization services, etc. based on the plant data. The cloud computing platform 102 may be part of public cloud or a private cloud. In the present embodiment, the cloud computing platform 102 includes a configuration module 110 stored in the form of executable machine-readable instructions. When executed, the configuration module 110 causes configuration of a coating machine for coating a surface with a coating substance in the manufacturing facility 107. The cloud computing platform 102 further includes a technical database 112 and a network interface 114.

Figure 2:
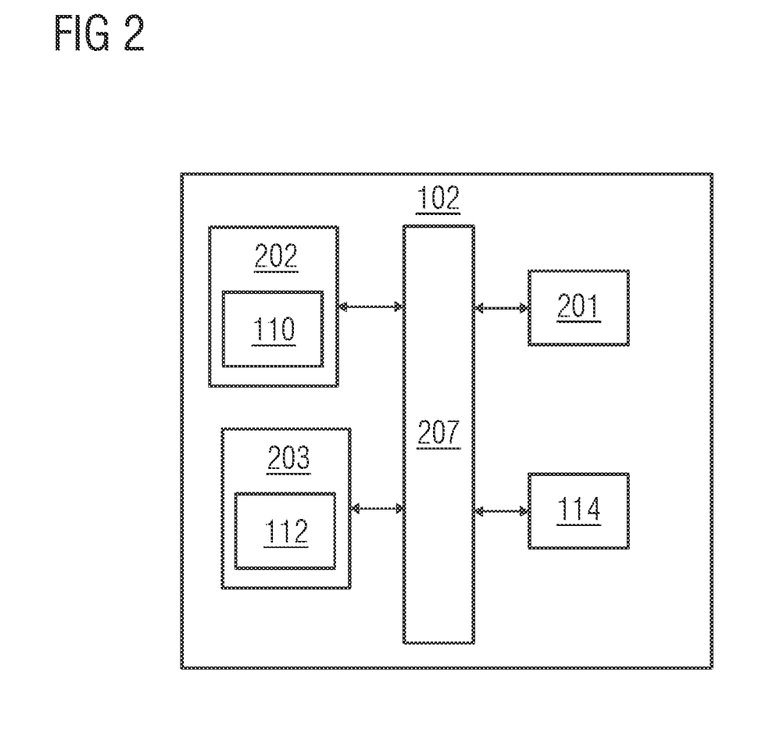
FIG. 2 is a block diagram of a system for configuring a coating machine for coating a surface using a coating substance, according to an embodiment.

The cloud platform 102 is further illustrated in greater detail in FIG. 2. Referring to FIG. 2, the cloud platform includes a processing unit 201, a memory 202, a storage unit 203, a network interface 114, a standard interface, or bus 207. The cloud platform 102 may be an exemplary embodiment of a system.

The processing unit 201, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 201 may also include embedded controllers, such as generic or programmable logic devices or arrays, application specific integrated circuits, single-chip computers, and the like. In general, a processing unit 201 may include hardware elements and software elements. The processing unit 201 may be configured for multithreading (e.g., the processing unit 201 may host different calculation processes at the same time), executing either in parallel or switching between active and passive calculation processes.

The memory 202 may be volatile memory and/or non-volatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes a configuration module 110 stored in the form of machine-readable instructions on any of the above-mentioned storage media and may be in communication with and executed by the processing unit 201. When executed by the processing unit 201, the configuration module 110 causes the processing unit 201 to configure a coating machine for coating a surface with a coating substance. Method acts executed by the processing unit 201 to achieve the abovementioned functionality are elaborated upon in detail in FIGS. 3, 4, 5, and 6.

The storage unit 203 may be a non-transitory storage medium that stores a technical database 112. The technical database 112 may store an event history of the one or more components 104A-N in the technical installation 107. Additionally, the technical database 112 may also include machine learning based models to configure the coating machine. The bus 207 acts as an interconnect between the processing unit 201, the memory 202, the storage unit 203, and the network interface 114.

Those of ordinary skill in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Figure 3:
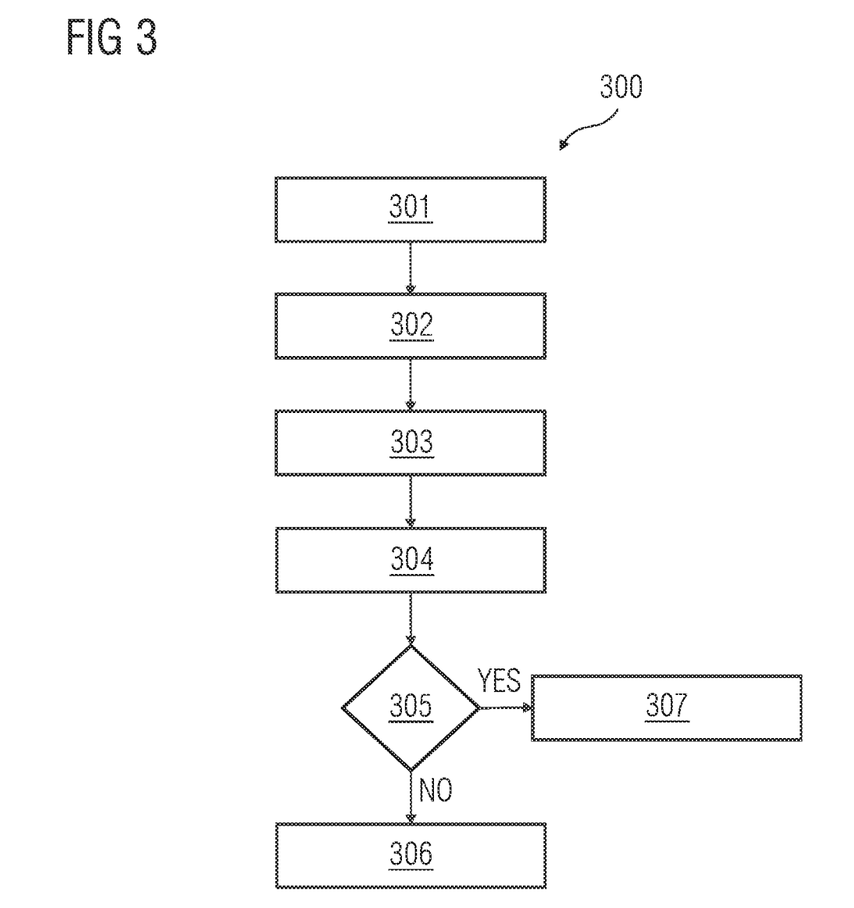
FIG. 3 is a process flowchart depicting a method of configuring a coating machine for coating a surface using a coating substance, according to an embodiment.

FIG. 3 is a process flowchart 300 of a method of configuring a coating machine for coating a surface using a coating substance, according to an embodiment. The coating substance may be, for example, a pigmented substance such as paint. The coating substance may also be without pigments. At act 301, a plurality of parameters associated with the coating operation is determined. In an embodiment, the plurality of parameters may include criteria associated with the coating machine associated with the coating substance. Such one or more criteria may include, for example, voltage associated with the coating machine and current passing through the coating machine. Additionally, the plurality of parameters may include a level of a pre-coating substance in a receptacle or tank configured to hold the pre-coating substance. In an embodiment, the pre-coating substance may be coated on to the surface before application of the coating substance. The pre-coating substance may be, for example, a primer. Further, the plurality of parameters may include characteristics of the coating substance such as pH of the coating substance, volume of the coating substance, and non-volatility of the coating substance. In a further embodiment, the plurality of parameters may also include temperature of a baking oven configured to bake the coating substance once coated on to the surface. The baking oven may be used for curing of the coating substance on the surface.

At act 302, one or more parameters are identified from the plurality of parameters associated with the coating operation. The one or more parameters may affect an attribute associated with the coating substance. For example, the attribute may be dry film thickness associated with the coating substance, wet film thickness associated with the coating substance, and/or thickness associated with individual coating layers of the coating substance. For example, dry film thickness is a thickness of the coating substance applied on top of a surface of a substrate. The surface may be a manufactured product such as an automotive body part, a casing of any device or machine, parts of a machine, etc. The dry film thickness may include a single layer or multiple layers of the coating substance or one or more coating substances. Dry film thickness of a surface is measured after the layer(s) of the coating substance is dried or cured. The method acts for identification of the one or more parameters from the plurality of parameters associated with the coating operation are disclosed in further detail in FIG. 4.

At act 303, an attribute value associable with the coating substance is predicted based on the value of the one or more parameters associated with the coating operation. In an embodiment, the prediction may be performed based on historical values associated with the one or more parameters and a historical attribute value associated with the one or more parameters.

At act 304, a coating operation by a coating machine is simulated for coating the surface using the coating substance in a simulation environment based on the predicted attribute value. Simulation of the coating operation enables determination of accuracy of the coating operation if the coating operation is performed in real-time based on the predicted attribute value. In an embodiment, simulation of the coating operation may be performed using one or more simulation models.

At act 305, results of the simulation of the coating operation to determine if the coating operation matches an expected standard are output. The expected standard may be a range of operation within which the coating operation may be performed to obtain an optimum outcome. If the results of simulation of the coating operation does not match the expected standard, then at act 306, the value of the one or more parameters associated with the coating operation is corrected. Correction of the one or more parameters associated with the coating operation enables optimization of the attribute associated with the coating substance. The method acts for correction of the one or more parameters associated with the coating operation are elaborated in further detail in FIG. 5. If the results of simulation of the coating operation matches the expected standard, then at act 307, the coating machine is configured based on the one or more values associated with the coating substance. In one embodiment, the prediction of the attribute value enables effective management of the coating operation associated with the coating substance. Therefore, accuracy of the coating operation is provided. Additionally, the quality of the layer of coating substance on the manufactured product is improved.

In an embodiment, the trained machine learning model is a random forest regression model. Random forest regression model is a supervised learning model that operates by processing data sets by multiple decision trees and deriving an average prediction of each of the decision trees. Therefore, the random forest regression model uses classification and regression in predicting an outcome based on given input data. In an embodiment, the random forest regression model draws a random sample from the plurality of features. The features may be, for example, the plurality of parameters associated with the coating operation. The features are processed at one or more nodes of the decision tree to generate an output prediction. The number of features that may be split on at each node of the decision tree may be limited to a pre-defined percentage of the total number of features available. Therefore, the predicted output from each node of the decision tree is based on a fair consideration and analysis of the features. This avoids reliance on an individual feature for prediction outcome. The output of each decision tree is aggregated through averaging, and a final predictive outcome is provided as an output. Additionally, the predicted outcome is unbiased and effective.

Figure 4:
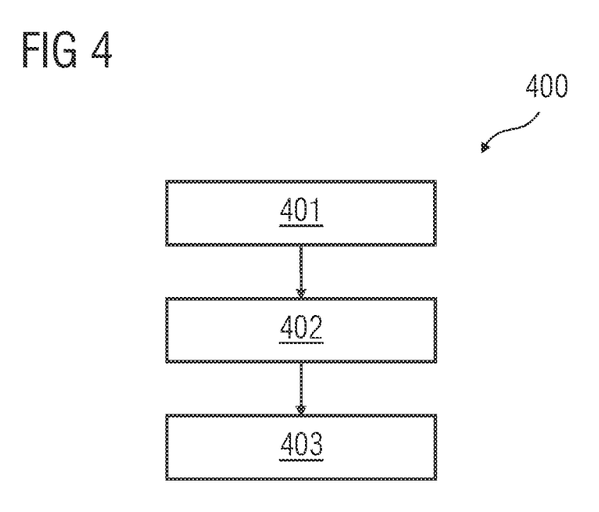
FIG. 4 is a process flowchart depicting a method of identifying one or more parameters from a plurality of parameters associated with a coating substance, according to an embodiment.

FIG. 4 is a process flowchart 400 of a method of identifying the one or more parameters from the plurality of parameters associated with the coating operation, according to an embodiment. At act 401, a relation between each parameter of the plurality of parameters and the coating operation is determined. The relation between the plurality of parameters and the coating operation is determined based on one or more reference values associated with the plurality of parameters. Exemplary reference values may include historical values associated with the plurality of parameters that may have been captured during past instances of the coating operation. The relation between the plurality of parameters and the coating substance may be an indication of which of the parameters would affect the attribute of the coating substance. In an embodiment, one or more parameters of the plurality of the parameters may affect the attribute of the coating substance more than the remaining parameters of the plurality of parameters.

At act 402, an effect of each parameter of the plurality of the parameters on the attribute associable with the coating substance is calculated. Each of the parameters may affect the attribute associated with the coating substance. The effect may be, for example, a degree of deviation from the pre-defined range of attribute value caused by a value associated with each parameter. For example, the manufactured product may be baked in a baking oven after the coating operation is completed. If a temperature value associated with the baking oven is not optimum for baking, the attribute value associated with the coating substance may deviate from the pre-defined range of attribute value. In an embodiment, the pre-defined range of attribute value may be between 10 μm to 30 μm. At act 403, the one or more parameters from the plurality of parameters are determined based on the calculated effect of each parameter of the plurality of the parameters associated with the coating operation on the attribute. In an embodiment, the one or more parameters may be chosen such that the one or more parameters have the greatest effect on the attribute associated with the coating substance in comparison to the other parameters in the plurality of parameters associated with the coating operation. In one embodiment, the one or more parameters affecting the attribute associated with the coating substance are identified accurately. Therefore, optimization of the attribute is enabled.

Figure 5:
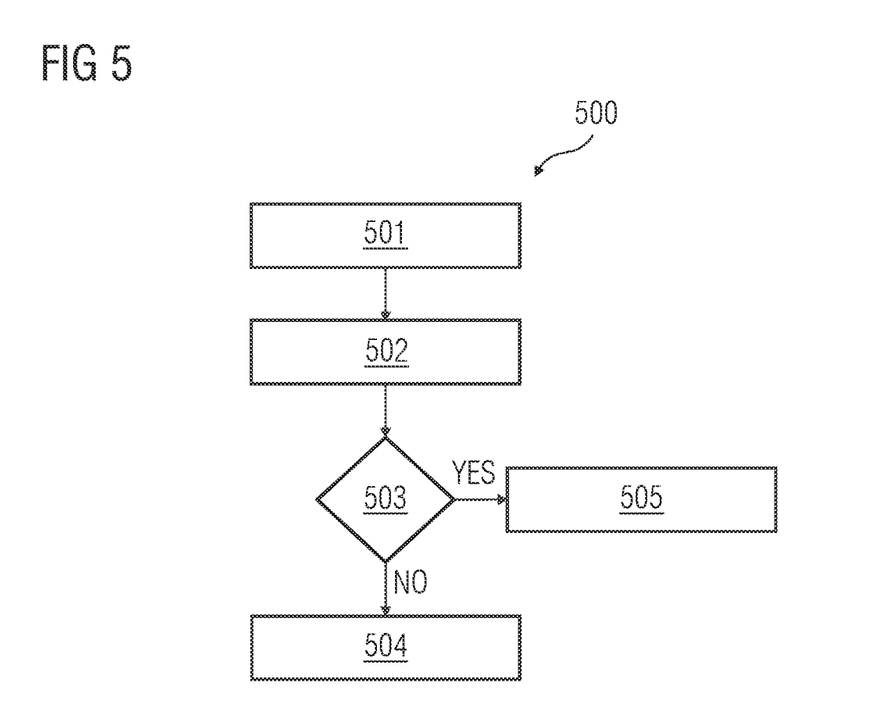
FIG. 5 is a process flowchart depicting a method of correcting the one or more parameters associated with the coating operation, according to an embodiment.

FIG. 5 illustrates a flowchart of a method 500 of correcting the one or more parameters associated with the coating operation, according to an embodiment. At act 501, a real-time value associated with the one or more parameters is identified. The real-time value may be obtained, for example, from the one or more sensors 106A-N associated with one or more components 104A-N involved in the coating operation. At act 502, a pre-defined range associated with the one or more parameters is obtained from the technical database 112. The pre-defined range may be an optimum range value associable with the one or more parameters. Therefore, the one or more parameters may provide an optimum attribute value of the coating substance if the one or more parameters are within the pre-defined range. At act 503, a determination is made if the real-time value of the one or more parameter is within the pre-defined range. If the real-time value of the one or more parameter is not within the pre-defined range, at act 504, the real-time value of the one or more parameters is corrected such that the real-time value of the one or more parameter is brought within the pre-defined range. If the real-time value of the one or more parameters is within the pre-defined range of operation, the coating operation is continued with the real-time value of the one or more parameters at act 505. In one embodiment, correction of the real-time value of the one or more parameters values enables optimizing the attribute associated with the coating substance. Additionally, loss of resources due to defective attributes such as dry film thickness is avoided. In an alternate embodiment, one or more recommendations for optimizing the attribute value associable with the coating substance may be provided if the value of the one or more parameters is not within the pre-defined range. For example, the recommendations may include one or more modifications to be made to the value associated with the parameters such that the attribute value associated with the coating substance is brought within the pre-defined range. The recommendations may enable a user of the technical installation 107 to determine which of the one or more parameters are to be modified and how the one or more parameters are to be modified.

Figure 6:
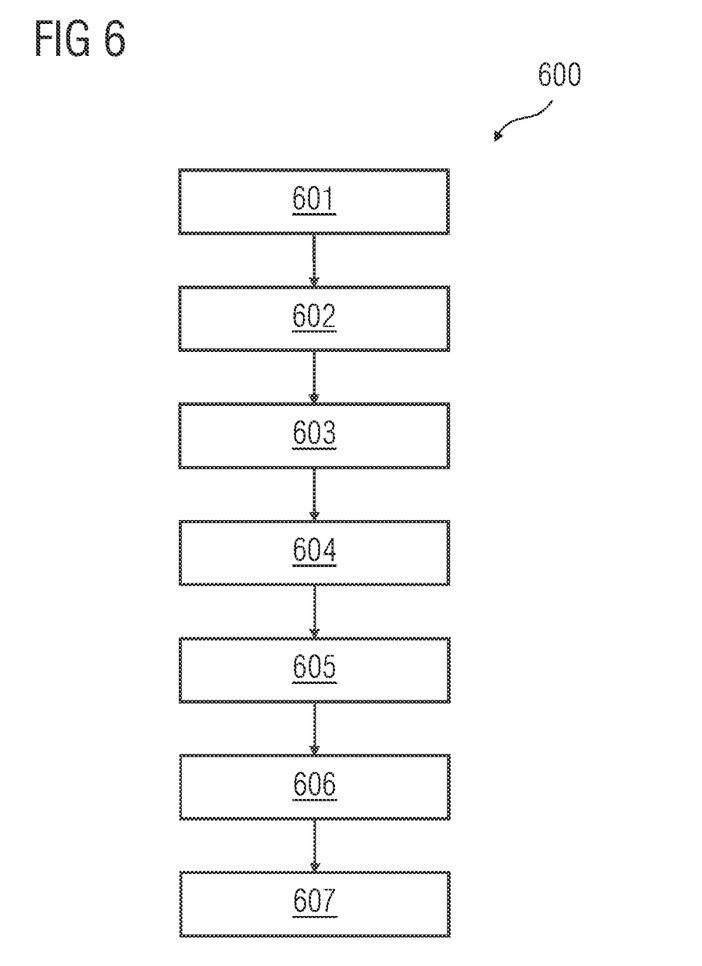
FIG. 6 is a process flowchart depicting a method of training a machine learning model for configuring a coating machine for coating a surface using a coating substance, according to an embodiment.

FIG. 6 is a process flowchart 600 of a method of training a machine learning model for configuring a coating machine for coating a surface using a coating substance, according to an embodiment. At act 601, one or more reference values associated with one or more parameters associated with the coating operation is obtained from the technical database 112. The one or more reference values may be historical data associated with the one or more parameters that may have been captured by the one or more sensors 106A-N in the previous instances of coating operation. The reference values associated with the one or more parameters provides an indication of the effect of each parameter of the plurality of parameters on an attribute associable with the coating substance.

At act 602, a real-time value associated with the one or more parameters is obtained from the one or more sensors 106A-N. The one or more sensors 106A-N may be communicatively coupled to the one or more components 104A-N involved in the process of applying the coating substance on the manufactured product. The machine learning model may be a random forest regression model. At act 603, the one or more reference values associated with the one or more parameters may be provided as an input to the random forest regression model. The random forest regression model may generate multiple decision trees using the one or more reference values as features. At act 604, the random forest regression model determines an attribute value associable with the coating substance, based on the real-time value associated with the one or more parameters and the one or more reference values associated with the one or more parameters. At act 605, it is determined whether the attribute value is within a pre-defined range. The pre-defined range of attribute value may be an optimum range within which the attribute value is to lie for the coating operation to be effective and accurate. At act 606, a correction factor associated with the real-time value of the one or more parameters associated with the coating operation is computed if the attribute value is not within the pre-defined range. In an embodiment, the attribute value determined by the machine learning model may be compared with the pre-defined range of attribute values. If the determined attribute value is outside the pre-defined range, then at act 607, weights assigned to nodes of the machine learning model are adjusted based on the correction factor associated with the real-time value of the one or more parameters associated with the coating operation. The above acts 601 to 607 are repeated until the attribute value computed by the machine learning model is found within the pre-defined range. In one embodiment, training of the machine learning model improves the accuracy with which the machine learning model predicts the attribute value associable with the coating substance.

In an embodiment, manufacturing facility 107 is an automobile painting unit in the manufacturing unit 100. The manufacturing facility 107 is configured to perform a coating operation on at least one part of an automobile. The manufacturing facility 107 may also be configured to perform downstream processing of the painted automobile part(s) for assembly of the automobile(s). The present embodiments enable configuration of the coating machine that is configured to coat a surface of the automobile part using a coating substance. When the automobile part is to be coating with a coating substance, the plurality of parameters associated with the coating operation is determined. The parameters are associated with the coating machine, coating substance, and one or more downstream processing acts to be performed on the automobile part to complete the coating operation. The one or more parameters such as voltage and current value associated with the coating machine, temperature of a baking oven in which the automobile part is to be baked, quantity of coating substance present in a receptacle configured to contain coating substance or a pre-coating substance, pH of the coating substance, volume of the coating substance, and non-volatility of the coating substance. Based on one or more reference values associated with the parameters, the one or more parameters of the plurality of parameters that affect the attribute value associated with the coating substance are determined. In the present embodiment, the attribute value associated with the coating substance is a dry film thickness value of the coating substance. For example, if the quantity of coating substance present in the receptacle configured to hold the coating substance or the pre-coating substance is below a threshold, the dry film thickness value of the coating substance may not be uniform across the automobile part after the completion of the coating operation. On determining the one or more parameters that affect the dry film thickness value the most, the real-time value associated with the one or more parameters is determined using the one or more sensors 106A-N in the manufacturing facility 107.

The real-time value of the one or more parameters and the reference values associated with the one or more parameters are provided to a trained machine learning model to predict a dry film thickness value associated with the coating substance. The coating operation is then simulated using a simulation model based on the predicted dry film thickness value. The results of the simulation enables determining whether the coating operation matches an expected standard. The expected standard of the coating operation is the coating operation in which the outcome of the coating operation provides a dry film thickness value within a pre-defined range of dry film thickness value. If the result of the simulation matches the expected standard, the coating operation is performed by maintaining the real-time value of the one or more parameters associated with the coating operation. However, if the simulated results do not match the expected standard, the value of the one or more parameters are corrected such that the dry film thickness value associable with the coating substance is brought within the pre-defined standard. Therefore, on completion of the coating operation, the dry film thickness of the automobile product is within the pre-defined range of dry film thickness value.

An advantage of the present embodiments described above is that downstream processing of the manufactured product is improved. Additionally, manual requirement of monitoring the plurality of parameters associated with the coating operation is eliminated. Further, the present embodiments enable prevention of wastage of resources due to non-optimum attributes associable with the coating substance once the coating substance is coated on to the manufactured product. Therefore, a significant amount of cost is saved by predicting the attribute value associable with the coating substance. The present embodiments also enable maintenance of uniform quality of the coating substance across different manufacturing products on which the coating substance is applied.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods, and uses, such as are within the scope of the appended claims. Those skilled in the art, having the benefit of the teachings of this specification, may effect numerous modifications thereto, and changes may be made without departing from the scope and spirit of the invention in its aspects.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of configuring a coating machine for coating a surface of a product using a coating substance, the method comprising:
   calculating an effect of each parameter of a plurality of parameters on at least one attribute associable with the coating substance;
   determining, from the plurality of parameters, one or more parameters that have a greatest effect on the at least one attribute, in comparison with other parameters of the plurality of parameters;
   determining, using one or more sensors and a processing unit, a real-time value associated with the one or more parameters from a plurality of parameters associated with a coating operation;
   predicting a value associated with at least one attribute associable with the coating substance based on an application of a trained machine learning model on the determined real-time value associated with the one or more parameters; and
   controlling the coating machine for coating the surface using the coating substance based on the predicted value associated with the at least one attribute associable with the coating substance.

2. The method of claim 1, further comprising:
   simulating the coating operation performed by the coating machine for coating the surface using the coating substance based on the predicted attribute value using a simulation model in a simulation environment;
   generating results of simulation of the coating operation;
   analyzing the results of the simulation of the coating operation; and
   determining whether the coating operation matches an expected standard based on the analysis of the results of simulation.

3. The method of claim 2, wherein configuring the coating machine for coating the surface using the coating substance comprises configuring the coating machine for coating the surface using the coating substance when the results of the simulation of the coating operation matches the expected standard.

4. The method of claim 2, further comprising correcting the real-time value of the one or more parameters associated with the coating operation when the results of the simulation of the coating operation does not match the expected standard.

5. The method of claim 4, further comprising predicting a new value of the at least one attribute associable with the coating substance based on the corrected real-time value of the one or more parameters.

6. The method of claim 4, wherein correcting the real-time value of the one or more parameters comprises:
   identifying the real-time value associated with the one or more parameters;
   determining when the real-time value of the one or more parameters associated with the coating operation is within a pre-defined range, wherein the pre-defined range is an optimum value range associable with the one or more parameters; and
   when the real-time value of the one or more parameters is outside the pre-defined range, correcting the value of the one or more parameters such that the value is within the pre-defined range.

7. The method of claim 1, further comprising initiating a coating operation at the configured coating machine for coating the surface of the product using the coating substance.

8. The method of claim 1, wherein determining the real-time value associated with the one or more parameters from the plurality of parameters associated with the coating operation comprises:
   determining the plurality of parameters associated with the coating operation;
   identifying the one or more parameters from the plurality of parameters associated with the coating operation, wherein the one or more parameters affect an attribute associated with the coating substance; and
   determining the real-time value associated with the one or more parameters associated with the coating operation.

9. The method of claim 8, wherein identifying the one or more parameters from the plurality of parameters associated with the coating operation comprises:
   determining a relation between each parameter of the plurality of parameters and the coating operation based on one or more reference values associated with the plurality of parameters.

10. The method of claim 1, further comprising providing one or more recommendations for optimizing the attribute value associable with the coating substance.

11. The method of claim 1, further comprising training the machine learning model to predict the value associated with the at least one attribute associable with the coating substance based on the determined real-time value associated with the one or more parameters.

12. The method of claim 1, further comprising:
identifying the real-time value associated with the one or more parameters;
determining whether the real-time value of the one or more parameters associated with the coating operation is within a pre-defined range, wherein the pre-defined range is an optimum value range associable with the one or more parameters; and
when the real-time value of the one or more parameters is outside the pre-defined range, providing one or more recommendations for optimizing the attribute value associable with the coating substance.

13. The method of claim 12, wherein the one or more recommendations include one or more modifications to be made to the value associated with the one or more parameters, such that the attribute value associable with the coating substance is brought within the pre-defined range.

14. A device for configuring a coating machine for coating a surface using a coating substance, the device comprising:
one or more processing units; and
a memory coupled to the one or more processing units, the memory comprising a configuration module configured to configure a coating machine for coating a surface of a product using a coating substance, the configuration of the coating machine comprising:
calculation of an effect of each parameter of a plurality of parameters on at least one attribute associable with the coating substance;
determination, from the plurality of parameters, of one or more parameters that have a greatest effect on the at least one attribute, in comparison with other parameters of the plurality of parameters;
determination, using one or more sensors and the one or more processing units, of a real-time value associated with the one or more parameters from a plurality of parameters associated with a coating operation; <prediction of a value associated with at least one attribute associable with the coating substance based an application of a trained machine learning model on the determined real-time value associated with the one or more parameters; and
control of the coating machine for coating the surface using the coating substance based on the predicted value associated with the at least one attribute associable with the coating substance.

15. A system for configuring a coating machine for coating a surface using a coating substance, the system comprising:
one or more servers; and
one or more sensors communicatively coupled to the one or more servers, wherein the one or more sensors are configured to capture a value associated with a plurality of parameters associated with a coating operation,
wherein the one or more servers comprise computer readable instructions that, when executed by the one or more servers, cause the one or more servers to configure a coating machine for coating a surface of a product using a coating substance, the configuration of the coating machine comprising:
calculation of an effect of each parameter of a plurality of parameters on at least one attribute associable with the coating substance;
determination, from the plurality of parameters, of one or more parameters that have a greatest effect on the at least one attribute, in comparison with other parameters of the plurality of parameters;
determination, using the one or more sensors, of a real-time value associated with the one or more parameters from a plurality of parameters associated with a coating operation;
prediction of a value associated with at least one attribute associable with the coating substance based on an application of a trained machine learning model on the determined real-time value associated with the one or more parameters; and
control of the coating machine for coating the surface using the coating substance based on the predicted value associated with the at least one attribute associable with the coating substance.

16. In a non-transitory computer-readable storage medium that stores instructions executable by one or more processors to configure a coating machine for coating a surface of a product using a coating substance, the instructions comprising:
calculating an effect of each parameter of a plurality of parameters on at least one attribute associable with the coating substance;
determining, from the plurality of parameters, one or more parameters that have a greatest effect on the at least one attribute, in comparison with other parameters of the plurality of parameters;
determining, using one or more sensors, a real-time value associated with the one or more parameters from a plurality of parameters associated with a coating operation;
predicting a value associated with at least one attribute associable with the coating substance based on an application of a trained machine learning model on the determined real-time value associated with the one or more parameters; and
controlling the coating machine for coating the surface using the coating substance based on the predicted value associated with the at least one attribute associable with the coating substance.

17. The non-transitory computer-readable storage medium of claim 16, wherein the instructions further comprise:
simulating the coating operation performed by the coating machine for coating the surface using the coating substance based on the predicted attribute value using a simulation model in a simulation environment;
generating results of the simulating of the coating operation;
analyzing the results of the simulation of the coating operation; and
determining whether the coating operation matches an expected standard based on the analysis of the results of simulation.

18. The non-transitory computer-readable storage medium of claim 17, wherein configuring the coating machine for coating the surface using the coating substance comprises configuring the coating machine for coating the surface using the coating substance when the results of the simulation of the coating operation matches the expected standard.

19. The non-transitory computer-readable storage medium of claim 17, wherein the instructions further comprise correcting the real-time value of the one or more parameters associated with the coating operation when the results of the simulation of the coating operation does not match the expected standard.

20. The non-transitory computer-readable storage medium of claim 19, wherein the instructions further comprise predicting a new value of the at least one attribute associable with the coating substance based on the corrected real-time value of the one or more parameters.

21. The non-transitory computer-readable storage medium of claim 16, wherein the instructions further comprise initiating a coating operation at the configured coating machine for coating the surface of the product using the coating substance.

\* \* \* \* \*

UNITED STATES PATENT AND TRADEMARK OFFICE
CERTIFICATE OF CORRECTION

| | |
|---|---|
| PATENT NO. | : 12,085,903 B2 |
| APPLICATION NO. | : 17/703950 |
| DATED | : September 10, 2024 |
| INVENTOR(S) | : Subrat Sahu |

It is certified that error appears in the above-identified patent and that said Letters Patent is hereby corrected as shown below:

In the Claims

Column 15 Line 38 Claim 14:
"operation; <prediction of a value associated with at"
Should be replaced with:
"operation;
       prediction of a value associated with at"

Page 1 of 1

Signed and Sealed this
Fifth Day of November, 2024

*Katherine Kelly Vidal*

Katherine Kelly Vidal
*Director of the United States Patent and Trademark Office*